Feb. 9, 1926.  
W. WAGNER  
1,572,827  
ELECTRICALLY OPERATED SEALING MEANS FOR VACUUM BOTTLES  
Filed May 29, 1923
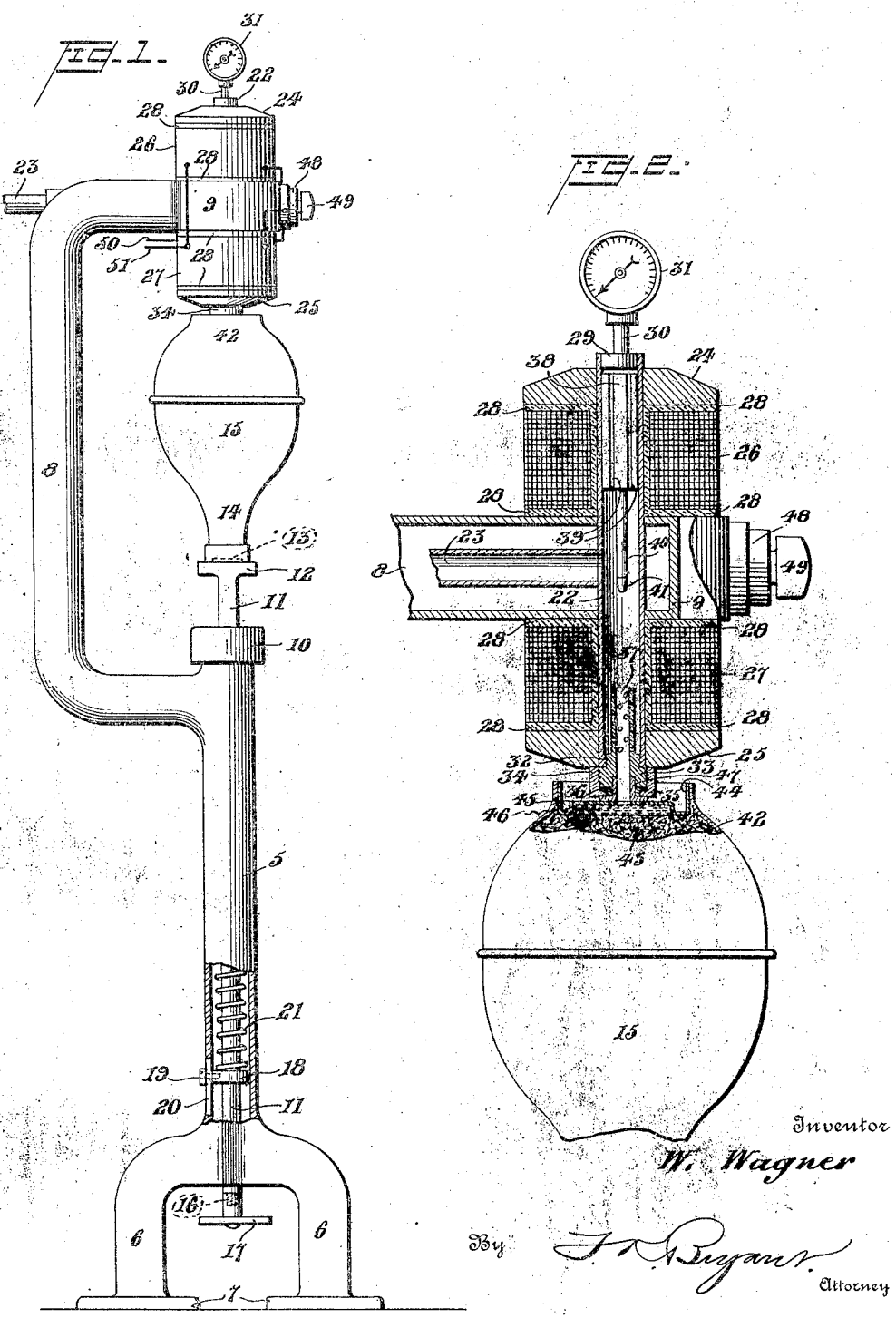

Patented Feb. 9, 1926.

1,572,827

UNITED STATES PATENT OFFICE.

WALTER WAGNER, OF CHICAGO, ILLINOIS.

ELECTRICALLY-OPERATED SEALING MEANS FOR VACUUM BOTTLES.

Application filed May 29, 1923. Serial No. 642,323.

*To all whom it may concern:*

Be it known that I, WALTER WAGNER, a citizen of Poland, residing at Chicago, in the county of Cook and State of Illinois, have invented certain new and useful Improvements in Electrically-Operated Sealing Means for Vacuum Bottles, of which the following is a specification.

This invention is an electric vacuum sealing apparatus best adapted for handling carafes or other vessels wherein a vacuous chamber is provided.

In accordance with the present method of manufacturing carafes or other similar vessels, substantially the final steps performed are the exhausting of air or other gaseous substance from the vacuous chamber and the sealing of the opening through which such air is evacuated. In the manufacture of metal carafes wherein a plurality of metal shells are employed, it is the present custom to seal the exhaustion opening by a soldering or welding process which is performed while the vacuum is maintained. This method was undoubtedly satisfactory for the first stages of development of the metal carafes, but has been found inadequate for the present more advanced development. It has been discovered and developed that by filling the vacuous space or chamber of the vessels with a finely divided material, a high degree of heat insulation may be obtained at a much less reduced gaseous pressure in the said vacuous space.

During my experiments along these most recent lines of development, I have found that it is practically impossible to prevent the collection of a fine dust upon the surface to be soldered which apparently is due to the use of the finely divided material referred to above. This collection of dust makes sealing of the air discharge opening by a soldering operation very unsatisfactory and impractical. In my pending applications Serial No. 546,047 filed March 23, 1922, Serial No. 592,666 filed October 5, 1922, and Serial No. 592,667, filed October 5, 1922. I have relied upon the use of a plug or check valve for sealing the air discharge opening of the vacuous chamber and have found this method very satisfactory.

It is, therefore, the primary object of this invention to provide a device capable of creating a sufficient degree of vacuum within the vacuous chamber and effectively sealing the opening through which the air has been exhausted by inserting or driving a plug therein.

A further object of the invention is to provide a device which will create the desired degree of vacuum and will effectively plug the discharge opening while the vacuum is maintained.

A still further object of the invention is to provide a device of the above mentioned type which will perform both operations stated without requiring the vessel to be moved from its original position. A still further object of the invention is to provide an electrically operated device for plugging the discharge opening of a vacuous chamber after the air has been exhausted therefrom.

Other objects and advantages of the invention will be apparent during the course of the following description.

In the accompanying drawing forming a part of this specification and in which like numerals are employed to designate like parts throughout the same, Figure 1 is a side elevational view, partly broken away of the device embodying this invention, and Figure 2 is a fragmentary view, partly in elevation and partly in vertical section of the device shown in Fig. 1

In the drawing, wherein for the purpose of illustration is shown a preferred embodiment of this invention, the numeral 5 designates an upright tubular post which is provided with integrally formed legs 6 having angularly arranged feet 7 formed on their outer ends which provide means for securing the device to a floor in any desired manner. Formed integrally with this upright tubular post 5 is a substantially U-shaped tubular frame member 8 which terminates at its upper free end in an integrally formed collar member 9. Removably secured to the upright tubular post 5 is a cap member 10 which is provided with an axially arranged opening, not shown, for slidably receiving and guiding the solid vertical plunger 11 which is provided at its upper end with an enlarged head or platform 12 having an integrally formed boss 13 which is adapted for engaging the mouth of the bottle neck 14 forming part of the carafe or other vessel 15 being manufactured. The extreme lower end of the plunger rod 11 is provided with a reduced threaded portion 16 which is employed for removably receiving a foot pedal 17 attached thereto. Adjustably secured to the plunger rod 11 is a collar 18 which is provided with a projecting set screw 19 slidably engaging a slot 20 formed in the upright tubular post 5 for the purpose of limiting the reciprocating movement of this plunger rod 11. Encircling this plunger rod and secured to the adjustable collar 18 and stationary cap 10 is a spiral spring 21 which operates to retain the plunger rod 11 in the position at its extreme upward limit of movement Suitably secured to the collar 9 formed on the upper free end of the tubular U-shaped frame member 8 is a brass tubular chamber 22 which is suitably connected to and communicates with a pipe 23 which extends longitudinally through the upper portion of the frame 8 and is directly connected with a vacuum pump, not shown. Suitably secured to the opposite ends of this brass chamber 22 and encircling the same are the upper and lower cap members 24 and 25 as shown. These cap members are provided for cooperating with the integrally formed collar 9 for the purpose of supporting the upper and lower solenoid coils 26 and 27 which are suitably insulated from the said caps and brass chamber 22 by layers of insulating material designated by the numeral 28. Suitably secured to the upper end of the brass chamber 22 is a plug member 29 which is provided with a suitable aperture for communicating with the stem 30 supporting the gage member 31 which is provided for recording the degree of vacuum created by the pump connected with the pipe 23. Movably connected to the lower end of the brass chamber 22 is a tubular brass fitting 32 which is provided with an externally threaded enlarged portion 33 positioned directly below the lower end of the said brass chamber and adapted for receiving a removable collar 34 which is provided with an inwardly directed annular flange portion 35 for the purpose of securing a rubber gasket 36 in position against the lower face of the enlarged portion 33. The brass fitting 32 further comprises a perpendicularly extending tubular member 37 which is of less diameter than the diameter of the brass chamber 22 and is provided with a series of apertures as shown. Positioned within the brass chamber 22 and adapted for being reciprocated therewithin is a plunger 38 which is preferably formed from steel for the purpose of producing an armature for the solenoid coils 26 and 27. This plunger or armature 38 is provided with a series of longitudinally extending grooves 39 formed in its peripheral face for allowing the suction created by the vacuum pump connected to the pipe 23 to reach the gage member 31 for recording the degree of vacuum existing in the brass chamber 22 and vacuous space in the carafe 15. Suitably secured to the lower end of this plunger or armature 38 is a reduced cylindrical extension 40 which is adapted for having removably positioned upon its extreme outer end the rubber plug 41 which is to be inserted in the air discharge opening of the carafe 15.

The carafe 15 consists in the form shown in connection with this device, of an outer shell 42 which forms the outer wall of the vacuous space that is filled with finely divided material 43 as shown. The flange base of this shell 42 is suitably connected to a cap member 44 which is provided with a concentrically arranged seat or pocket 45 adapted for receiving several layers of wire mesh or the like 46 for the purpose of preventing the withdrawal of the finely divided material 43 from the vacuous space by the vacuum pump during its operation. This cap 44 is provided with a nipple 47 which is adapted for being positioned within a suitable recess formed in the locking collar 34, rubber washer or gasket 36 and enlarged portion 33 of the brass fitting 32, as best shown in Fig. 2. It will be apparent that the rubber gasket 36 is provided for preventing the admission of air within the brass chamber 22 from the atmosphere external of the vacuous chamber.

Suitably mounted upon the enlarged collar formation 9 of the bracket member 8 is an electric three-way switch 48 which is provided with a suitable operating knob 49 as shown. Referring particularly to Fig. 1 it will be seen that supply wires 50 and 51 are furnished for suitably connecting the upper and lower solenoid coils 26 and 27 and the various terminals of the three-way switch 48 as shown, for the purpose of allowing the upper and lower coils to be selectively energized thereby reciprocating the steel plunger or armature 38 within the brass chamber 22.

The operation of the device is as follows:—

For the purpose of positioning the carafe 15 in operative relation with the vacuum creating and plugging portion of the device, the foot pedal 17 is forced downwardly by the operator for allowing the insertion of the nipple 47 carried by the bottom of the carafe within the recess or opening formed in the elements secured to the bottom end of the brass chamber 22. After this nipple has been properly positioned, the operator's foot is removed from the pedal 17 for allowing the tension spring 21 to draw upwardly on the collar 18 for forcing the enlarged portion 12 carried by the upper end of the plunger rod 11 against the neck 14 of the said carafe thereby securely holding the latter in its operative position. The current is then connected with the upper solenoid coil 26 for the purpose of retaining the steel plunger or armature 38 in the position shown in Fig. 2 after which the vacuum pump is started or directly connected with the pipe 23 for exhausting the air or other gaseous substance from the vacuous chamber of the carafe 15. After a suitable vacuum has been created, the switch knob 49 is operated for throwing the current from the upper solenoid coil 26 to the lower solenoid coil 27 thereupon allowing the steel plunger or armature 38 to be released from the field of magnetic flux created by the upper solenoid core and allow the same to fall due to the force of gravity until it enters the field of flux of the lower coil 27. With the combined force of gravity and magnetic flux of the lower solenoid coil 27, the rubber plug 41 will be driven solidly into the nipple 47 carried by the bottom of the carafe 15. It will be seen that the apertures formed in the perpendicular extension 37 will allow the vacuum to be maintained during the downward movement of the extension 40 and plug 41 through this fitting 32. After the above described operation has taken place the carafe 15 has been properly sealed for preventing the admission of air within the vacuous chamber and the vacuum pump may be disconnected from the pipe 23 for allowing the said carafe to be removed from the device. The removal of the carafe is accomplished by again forcing downwardly upon the foot pedal 17 for removing the upward pressure of the coil spring 21 against the back of the said bottle or carafe. With the steel plunger or armature at its extreme lower position and while it is still in the field of flux of the lower solenoid 27, a new plug 41 may be secured to the end of the extension 40 for preparing the device to repeat the operation just described.

It is to be understood that the form of this invention herewith shown and described is to be taken as a preferred example of the same, and that various changes in the shape, size, and arrangement of parts may be resorted to without departing from the spirit of the invention or the scope of the subjoined claims.

What is claimed as new is:—

1. The method of producing a vacuum in a metallic walled chamber wherein a finely divided material is positioned and sealing the same which consists in connecting the chamber while in an inverted position to a vacuum pump and sealing the chamber by electrically inserting a plug into its connection after the said chamber has been evacuated.

2. The method of producing a vacuum in a metallic walled chamber wherein a finely divided material is positioned and sealing the same which consists in connecting the chamber while in an inverted position to a vacuum pump and sealing the chamber by inserting a plug into its connection both gravitationally and electrically after the said chamber has been evacuated and while the vacuum is maintained.

3. The method of producing a vacuum in a metallic walled chamber wherein a finely divided material is positioned and sealing the same which consists in connecting the chamber while in an inverted position to a vacuum pump and sealing the chamber by dropping and subsequently electrically inserting a plug into its connection after the said chamber has been evacuated.

4. The method of producing a vacuum in a metallic walled chamber wherein a finely divided material is positioned and sealing the same which consists in connecting the chamber while in an inverted position to a vacuum pump and sealing the chamber by dropping and subsequently electrically inserting a plug into its connection after the said chamber has been evacuated and while the vacuum is maintained.

5. The method of producing a vacuum in a multiple shell metallic vessel wherein a finely divided material is positioned within the vacuous space and sealing the same which consists in connecting the vessel while in an inverted position to a vacuum pump, retaining a previously formed sealing element in suspense during the operation of evacuation, and both gravitationally and electrically inserting said element in the connection of said vessel after the vacuum has been created.

6. The method of producing a vacuum in a multiple shell metallic vessel wherein a finely divided material is positioned within the vacuous space and sealing the same which consists in connecting the vessel while in an inverted position to a vacuum pump, retaining a previously formed sealing element in suspense during the operation of evacuation, and electrically inserting said element in the connection of said vessel after the vacuum has been created.

7. The method of producing a vacuum in a multiple shell metallic vessel wherein a finely divided material is positioned within the vacuous space and sealing the same which consists in connecting the vessel while in an inverted position to a vacuum pump, electrically retaining a previously formed sealing element in suspense during the operation of evacuation, and electrically inserting said element in the connection of said vessel after the vacuum has been created.

In testimony whereof I affix my signature.

WALTER WAGNER.